US010354002B2

(12) United States Patent
Gong et al.

(10) Patent No.: US 10,354,002 B2
(45) Date of Patent: Jul. 16, 2019

(54) INTERACTION RELATIONSHIP BUILDING AND EXPLORER FOR DASHBOARD

(71) Applicant: Business Objects Software Ltd., Dublin (IE)

(72) Inventors: Zhiyong Gong, Shanghai (CN); Ziqin Li, Shanghai (CN); Zheng Wang, Shanghai (CN)

(73) Assignee: Business Objects Software Ltd., Dublin (IE)

( * ) Notice: Subject to any disclaimer, the term of this patent is extended or adjusted under 35 U.S.C. 154(b) by 261 days.

(21) Appl. No.: 14/955,068

(22) Filed: Dec. 1, 2015

(65) Prior Publication Data

US 2017/0154026 A1 Jun. 1, 2017

(51) Int. Cl.
*G06F 17/24* (2006.01)
*G06T 11/20* (2006.01)

(52) U.S. Cl.
CPC .......... *G06F 17/246* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 2005/0198042 A1* | 9/2005 | Davis | ................. | G06F 17/2247 |
| 2007/0130113 A1* | 6/2007 | Ting | ..................... | G06F 16/248 |
| 2008/0163099 A1* | 7/2008 | Gu | .................... | G06Q 10/0637 |
| | | | | 715/780 |
| 2009/0281845 A1* | 11/2009 | Fukuda | ............ | G06Q 10/06393 |
| | | | | 705/7.39 |
| 2013/0174063 A1* | 7/2013 | Chmiel | ................. | G06F 3/0484 |
| | | | | 715/762 |
| 2014/0053091 A1* | 2/2014 | Hou | .................. | G06F 17/30389 |
| | | | | 715/769 |
| 2014/0075380 A1* | 3/2014 | Milirud | ................. | G06F 11/323 |
| | | | | 715/810 |
| 2014/0149836 A1* | 5/2014 | Bedard | ............... | G06F 17/2247 |
| | | | | 715/212 |
| 2016/0253078 A1* | 9/2016 | Ebtekar | ................. | G06T 11/206 |
| | | | | 715/735 |

* cited by examiner

*Primary Examiner* — Stephen S Hong
*Assistant Examiner* — Sanchita Roy
(74) *Attorney, Agent, or Firm* — Klarquist Sparkman, LLP

(57) ABSTRACT

A technology for building and displaying interaction relationships between visual components of a dashboard is provided. In accordance with one aspect, interaction relationships are defined between the components of the dashboard using a data grid. A relationship may be defined by associating a component to a grid cell and defining a formula in the grid cell based on one or more other grid cells which are further associated to one or more other components. In accordance with another aspect, information of a dashboard including dashboard components, input data and output data in the dashboard is converted into dashboard data models. An interaction relationship graph may be generated based on interactions of the input data and output data of the components. The interaction relationship graph comprises source-to-target relationships between source and target components of the dashboard. The interaction relationship between the visual components of the dashboard may be presented using the dashboard data models containing the source-to-target relationships.

20 Claims, 13 Drawing Sheets

300

800

INTERACTION RELATIONSHIP BUILDING AND EXPLORER FOR DASHBOARD

TECHNICAL FIELD

The present disclosure relates generally to computer systems, and more particularly to a framework for building and exploring interaction relationships for visual components of a dashboard.

BACKGROUND

Dashboard building tools are used to create dashboards for visualizing data. A dashboard contains visual components that display large amounts of data in an efficient and useful manner. A dashboard designer may set up interactions relationships between the dashboard components to facilitate effective analysis of the visualized data. However, for a complex dashboard with hundreds of components, it is complicated and hard to maintain and manage the interaction relationships between the components. For example, it is difficult and cumbersome for a dashboard designer to identify components which are linked to each other especially in the case where the dashboard includes a huge amount of dashboard components. Moreover, it may be challenging to modify the components as the designer does not know which components are impacted, for example, when a source component is removed or replaced with other components.

It is therefore desirable to provide an improved framework for building and displaying interaction relationships between dashboard components.

SUMMARY

A technology for building and displaying interaction relationships between visual components of a dashboard is provided. In accordance with one aspect, interaction relationships are defined between the components of the dashboard using a data grid. A relationship may be defined by associating a component to a grid cell and defining a formula in the grid cell based on one or more other grid cells which are further associated to one or more other components. In some implementations, the components may be decoupled from the grid cells while maintaining the formula defined in the grid, and other components may be associated to the grid cells.

In accordance with another aspect, information of a dashboard including dashboard components, input data and output data in the dashboard is converted into dashboard data models. An interaction relationship graph may be generated based on interactions of the input data and output data of the components. The interaction relationship graph comprises source-to-target relationships between source and target components of the dashboard. The interaction relationship between the visual components of the dashboard may be presented using the dashboard data models containing the source-to-target relationships.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for building interaction relationships for visual components of a dashboard and an interaction relationship explorer for displaying interaction relationships is provided. In accordance with one aspect, a relationship engine builds the interaction relationships between the visual components of a dashboard using a data grid containing cells (e.g., spreadsheet). Relationships, such as for example, formulas, may be defined in the cells of the data grid. The relationships are used to link the components of the dashboard. In some implementations, the relationship engine allows for decoupling of the dashboard components and linking different components together without modifying or breaking the relationships defined in grid cells.

In accordance with another aspect, the framework facilitates previewing and analyzing the interaction relationships of the components of a dashboard. The relationship engine, in one implementation, generates a relationship graph for the components of the dashboard. The relationship graph contains interaction relationships between the visual components of the dashboard. In some implementations, a user may preview or explore the interaction relationships visually via an animation by a graphical display of the components' relationships using a set of frames. The set of frames, for example, displays source-to-target relationships of the components. The framework advantageously enables a user to identify components that are linked to each other based on the interaction relationships, and determine components that impact or are impacted by other components. The framework facilitates, for example, dashboard designers in designing dashboards.

The framework described herein may be implemented as a method, computer-controlled apparatus, a computer process, a computing system, or as an article of manufacture such as a computer-usable medium. These and various other features will be apparent from the following description.

Figure 1:
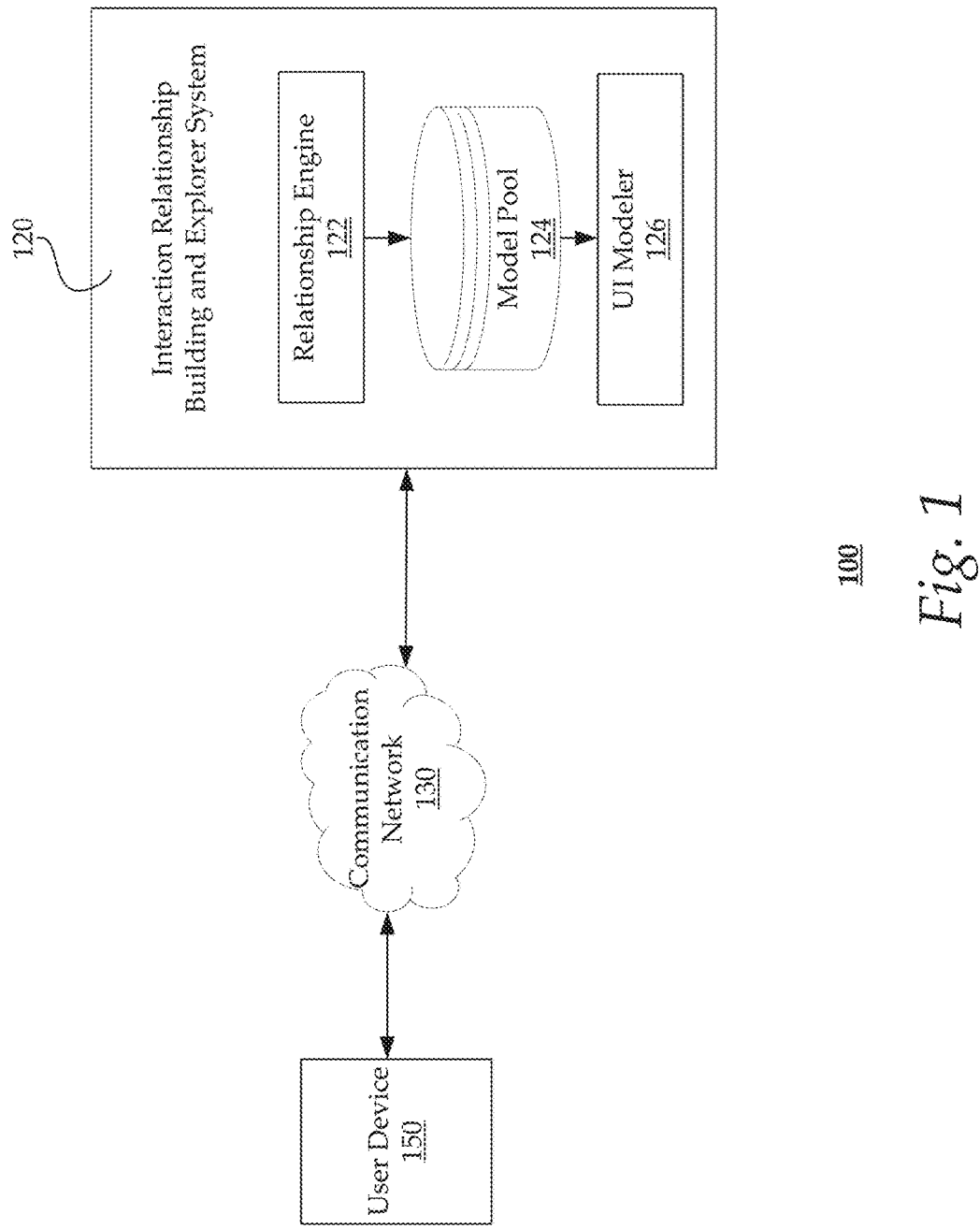
FIG. 1 is a block diagram of an exemplary computing environment.

FIG. 1 shows a block diagram of an exemplary computing environment 100. The environment 100, for example, includes an interaction relationship building and explorer system 120. The interaction relationship building and explorer system, for example, is located on a server connected to a communication network 130 and interacts with a user device 150. For example, the interaction relationship building and explorer system may have a distributed architecture, such as a client-server architecture. Other types of architectures may also be useful.

A server may include one or more computers or servers. A computer includes a memory and a processor. Various types of computers may be employed for the server. For example, the computer may be a mainframe, a workstation as well as other types of processing devices. The memory of a computer may include any memory or database module. The memory may be volatile or non-volatile types of non-transitory computer-readable media such as magnetic media, optical media, random access memory (RAM), read-only memory (ROM), removable media, or any other suitable local or remote memory component. The computers or servers are connected through a communication network such as internet, intranet, local area network (LAN), wide area network (WAN) or a combination thereof. The servers, for example, are part of the same private network. The servers may be located in single or multiple locations.

As for the user device, it may be any local computing device with, for example, a local memory and a processor. The memory may be volatile or non-volatile types of non-transitory computer-readable media such as magnetic media, optical media, RAM, ROM, removable media, or any other suitable local or remote memory component. The user device may include a personal computer (PC), a tablet PC, a workstation, a network computer or a mobile computing device, such as a laptop, a smart phone device or a tablet. Other types of processing devices may also be used. Illustratively, the environment includes one user device. It is to be understood, however, that the environment may include numerous user devices connected to the communication network. The user devices may be any type or combination of types of user devices. In some implementations, the user device comprises a graphical user interface (GUI). A GUI may provide an efficient and user-friendly manner of presenting information or communicating with the system. Other types of user interfaces may also be useful.

As discussed, the various components of the network are connected through the communication network. For example, components of the network may be connected by internet. Other types of networks or network connections may also be useful. For example, the network connections may include a WIFI or a 3G/4G/LTE connection. In some cases, the network may be a cloud. A user may connect to the server using the user device. The user device may be referred to as the client side while the interaction relationship building and explorer system may be referred to as the server side. Other types of configurations may also be useful.

In some implementations, the interaction relationship building and explorer system may be a web-based system. For example, a user may access the system using a web browser on the user device. For example, the web browser may be used to access various applications in the interaction relationship building and explorer system. In other implementations, the interaction relationship building and explorer system may be an application loaded onto the user device.

The interaction relationship building and explorer system, in one implementation, facilitates building interaction relationships between visual components of a dashboard and enables an end user such as a dashboard designer to preview the interaction relationships between the visual components of a dashboard of interest. A dashboard may include different elements or components to present aggregated views of data using, for example, metrics, trends, visualizations and interactions. The data may be obtained from a data source connected to the network, such as the cloud network. In some implementations, the data source stores data from various sources such a data repository, relational databases, other types of systems, organizations and entities. The data source may include data such as database files, operational systems, reports, spreadsheets, XML, files, flat files, set of related records or data from the Internet. Providing other types of data from various data sources may also be useful. The data may be generated from one or more software applications. A software application may include various types of functions, such as report generation and functions related to data analytics. The software application may comprise a client server architecture. For example, data, reports and other information may be stored in a server. Alternatively, the software application may be locally installed in a client or a stand alone computer. In such cases, the data, reports and other information are locally stored. Other configurations for storing and retrieving the data for display may also be useful.

The interaction relationship building and explorer system may be employed, for example, in a dashboard design application. A dashboard design application may be used to design or create dashboards. The interaction relationship building and explorer system, for example, may be integrated into the dashboard design application. In other implementations, the interaction relationship building and explorer system may be a separate application which interacts with the dashboard design application. The interaction relationship building and explorer system may be used in, for example, SAP Business Objects Dashboards by SAP SE. Other configurations and types of dashboard design applications and interaction relationship building and explorer system may also be useful.

Figure 2:
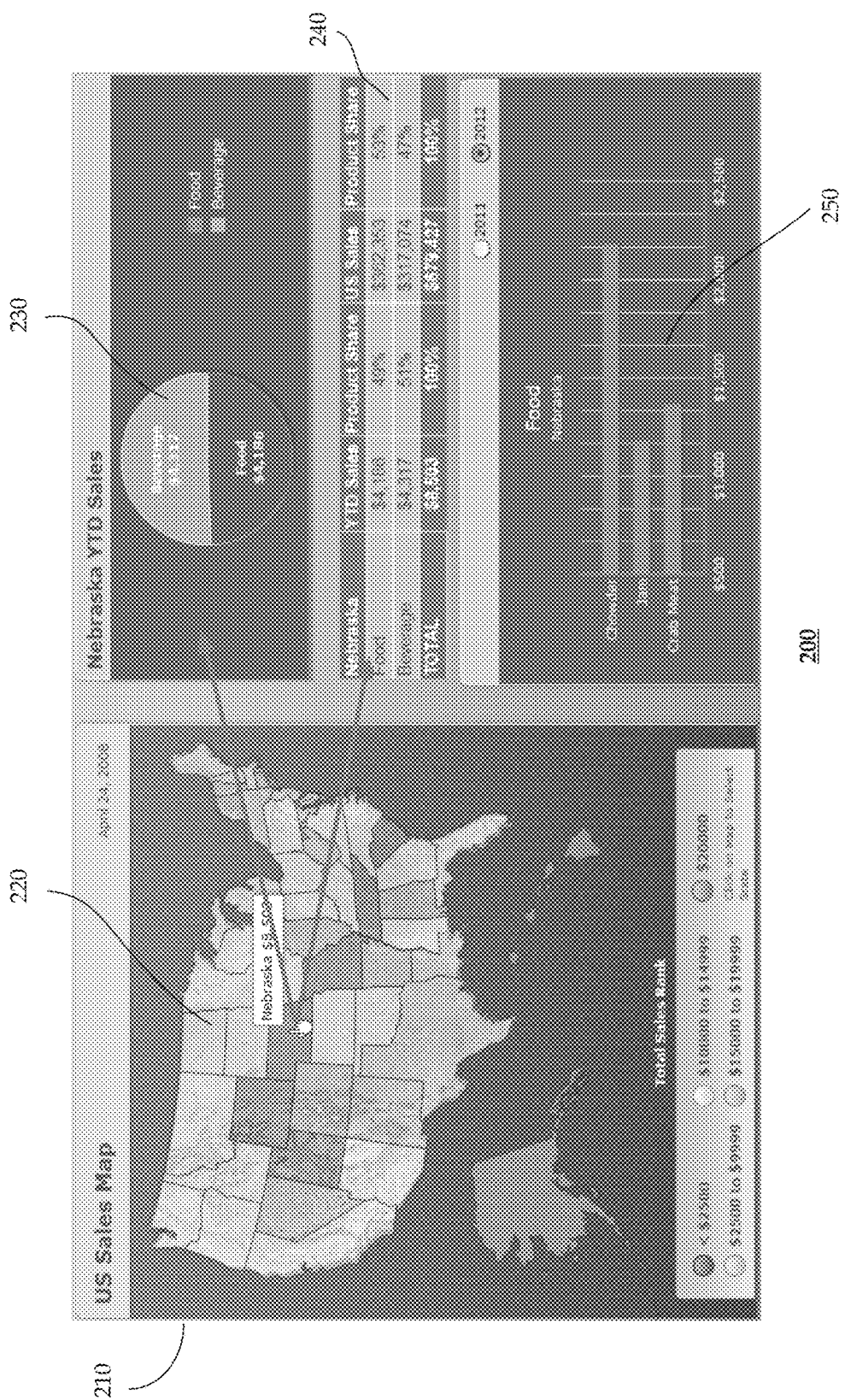
FIG. 2 shows a screenshot of an exemplary embodiment of a dashboard.

FIG. 2 shows a screenshot of an exemplary embodiment of a dashboard 200. As shown, the dashboard includes a dashboard UI or panel 210. Within the panel, there may be one or more visual or dashboard components to facilitate data visualization. The visual components display or select large amounts of data for visualization in an efficient manner. The visual components may be categorized by function such as charts, selectors, maps and filters. The different components are used to visualize data or portions of data, such as by filtering. Different components may be used depending on the type of data. The dashboard may also be provided with different features or functions. For example, elements such as drop down menus, sliders and command buttons for performing analyses and dynamic visualization of data may be provided to enable interactions by a user at runtime. Other types of information or analytics may be displayed by the dashboard, depending on the application.

Illustratively, the dashboard provides views of data for sales in a region. The dashboard includes a map component 220 for displaying total sales of a country by region (e.g., US), a pie chart component 230 representing overview sales data by product based on a selected region in the map component, a table component 240 displaying detailed sales data by product of a selected region in the map component, and bar chart component 250 displaying a breakdown of sales data for a particular category of product based on the selected region. A user such as a dashboard designer may set up an interaction relationship from a source component to a target component of the dashboard via data binding. The source and target components may have interaction relationship, for example, when the input data of the target component is bound to the output data of the source component.

For example, the map component may be defined as a source component with interaction relationship to the pie chart and table target components 230 and 240, while the pie chart component may be defined as a source component with interaction relationship to the bar chart component 250 as the target component. Upon a user selecting the region "Nebraska" on the map component, the pie chart component may be triggered to display the overview sales data by product based on the selected region and the table component may be triggered to display the detailed sales data of the selected region. Furthermore, the bar chart component may be triggered to display the breakdown of sales data for food category in "Nebraska" in response to the change in the output data of the pie chart component based on the selected "Nebraska" region.

Referring back to FIG. 1, the interaction relationship building and explorer system includes a relationship engine 122, a model pool 124 and a user interface (UI) modeler 126. Providing other modules for the interaction relationship building and explorer system may also be useful. The various modules may be employed to build interaction relationships between components of a dashboard, and to visually analyze or explore the interaction relationships between the dashboard components.

The relationship engine facilitates building the interaction relationships between the visual components of the dashboard. The relationship engine employs a data grid with cells to define the relationships between the visual components. The grid includes rows and columns forming the cells of the grid. For example, the grid may be a spreadsheet. The relationship engine builds the interaction relationship by defining relationships or dependencies between the components using the cells of the grid. For example, the relationship engine links the components of the dashboard by associating one or more components to a grid cell and defining a relationship in the grid cell based on one or more other cells. For example, a formula may be defined for the grid cell based on one or more other grid cells which are associated to one or more other components. The relationship engine stores the built interaction relationships of the components of the dashboard into the model pool.

Figure 3:
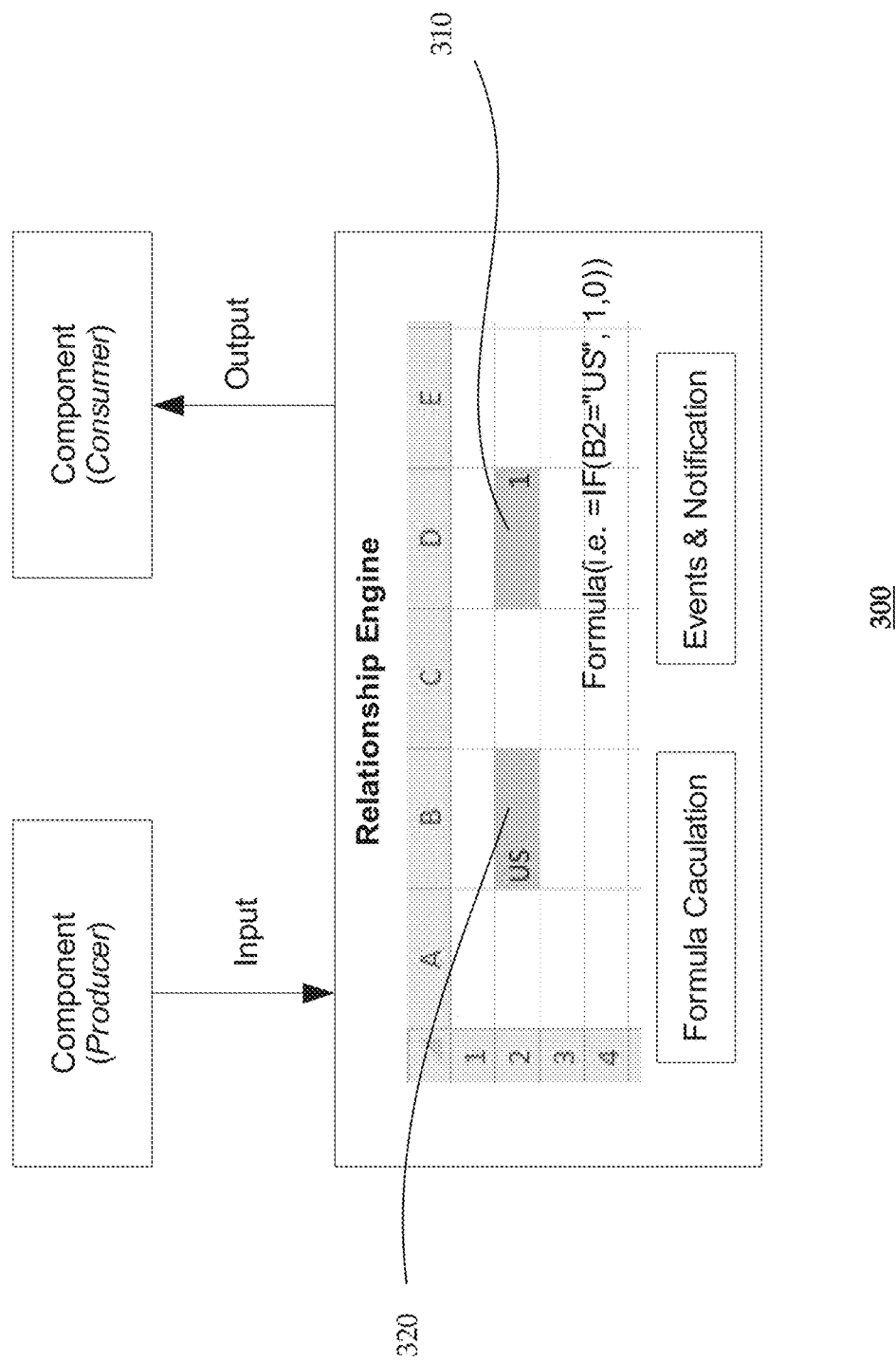
FIG. 3 shows an exemplary data grid for building the interaction relationships between the components of a dashboard.

FIG. 3 shows an exemplary data grid or spreadsheet 300 of the relationship engine for building the interaction relationships between the components of a dashboard. In one implementation, the data grid may be used to define relationships for linking the dashboard components. Each dashboard component could produce some data and input the data to the relationship engine as well as consume any data output from the relationship engine. A component producing data which is input into the relationship engine may be referred to as a producer while a component consuming data which is output from the relationship engine may be referred to as a consumer.

A user, for example, may link multiple components by associating the components to the grid cells and defining some relationships (e.g., formulas) between the cells of the grid. For example, a cell D2 310 of the grid may be defined with a relationship to another cell B2 320 using a simple formula "=IF(B2="US", 1,0)". A map component, for example, may be associated to cell B2 320 to input some country name in the cell B2 in response to a user interaction while a label component may be associated to the cell D2 310 to display an output value in cell D2 310 based on the input in cell B2 320 and the defined formula. Accordingly, the relationship engine builds an interaction relationship between the map and label components using the grid cells with which the components are associated. Using the exemplary defined formula, when the user clicks on the "US" on the map component, the label component shows "1", whereas when the user clicks on other countries on the map component, the label component shows "0". The label component is impacted by the user interaction on the map component. The map component may be referred to as the source component while the label component is the target component in the interaction relationship.

Figure 4:
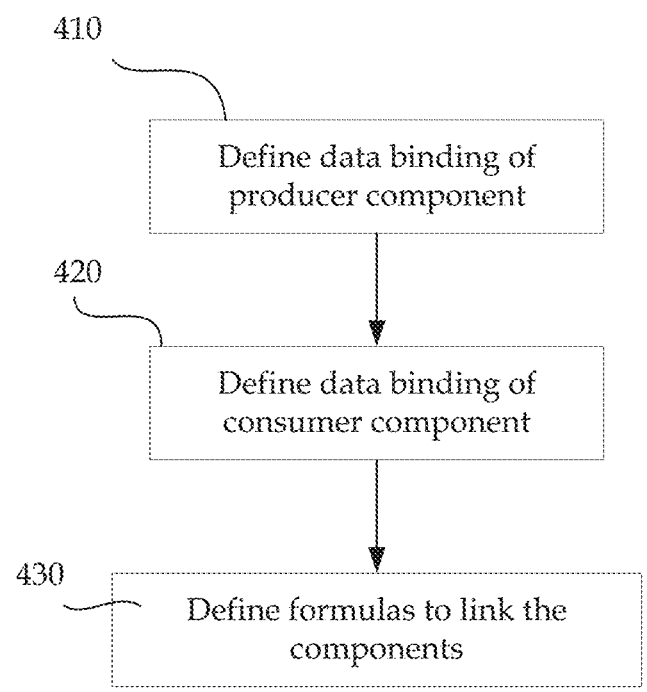
FIG. 4 shows an exemplary process for building the relationship between the components of a dashboard.

FIG. 4 shows an exemplary process 400 for building the relationship between the components of a dashboard. At 410, the relationship engine receives user input to define the data binding of a producer component. For example, the user input associates the producer component to one or more grid cells such that the producer component may input data to the grid cells. At 420, the relationship engine receives user input to define the data binding of a consumer component. For example, the user input associates the consumer component to one or more grid cells such that the consumer component may retrieve output data from the grid cells. At 430, the relationship engine receives user input to define one or more formulas or relationships in the cells for linking the components.

Figure 5:
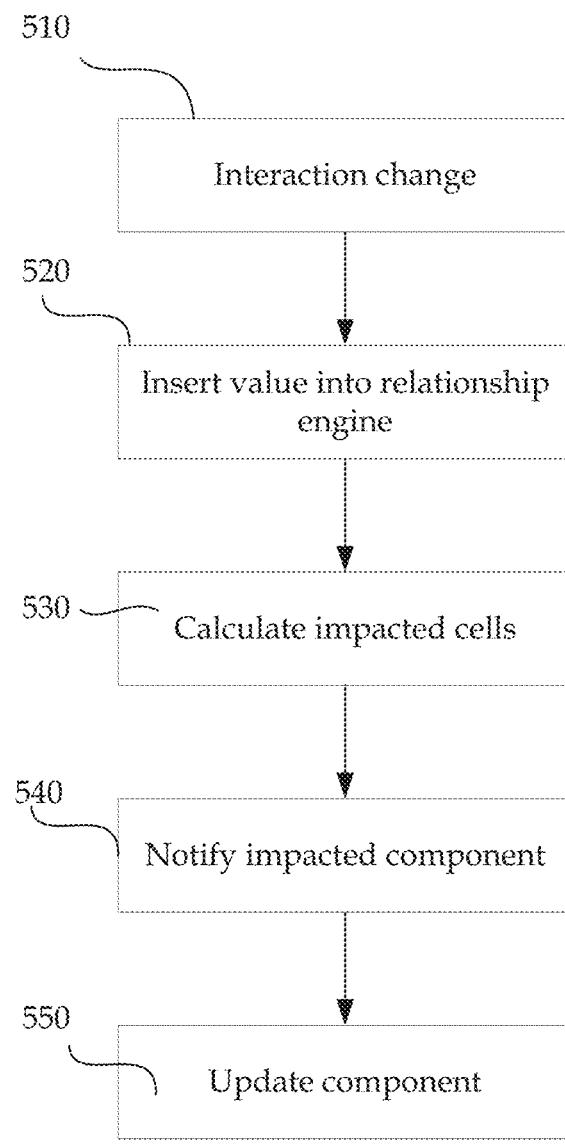
FIG. 5 shows an exemplary process of an interaction after the relationships are built.

FIG. 5 shows an exemplary process 500 of an interaction after the relationships are built. At 510, the relationship engine receives an interaction change. For example, the relationship engine receives user input on a component of the dashboard. For example, the user input may be a selection such as a click on country (e.g., "US") on a map component. At 520, the relationship engine inserts a value resulting from the interaction change to the relationship engine. For example, the user selection of an element in the map component causes the map component to produce a value. The relationship engine inputs the value into a first cell of the grid with which the map component is linked. The input value may cause the value of one or more cells to change depending on the defined relationship or dependencies of other cells to the first cell with which the map component is linked.

At 530, the relationship engine calculates the values of one more cells impacted by the first cell. For example, the relationship engine calculates the values of an impacted cell using the defined formula for that impacted cell based on the first cell. At 540, the relationship engine notifies one more components impacted by the interaction. For example, the impacted components are associated to the impacted cells. At 550, the relationship engine updates the one more components impacted by the interaction.

In some implementations, the relationship engine enables decoupling of the components of the dashboard and linking different components together without modifying or breaking the defined relationships. For example, the components which are linked using the relationships defined in the grid may be decoupled by removing the association of the components to the relationships defined in the grid cells. For example, the formulas or relationships defined in the cells may be maintained and used for linking other components. In other words, the defined relationships in the grid are not removed as the components are decoupled. Different components may then be associated to the cells using the same relationships which have been defined previously. As such, components of the dashboard may easily be modified, replaced or updated.

In one implementation, the relationship engine facilitates identifying or analyzing the interaction relationships between the components of a dashboard of interest. The dashboard of interest may be a dashboard built by a dashboard designer and stored in the model pool, while in other implementations, may be a dashboard existing in the interaction relationship building and explorer system. The relationship engine detects information of the dashboard and converts (or transform) the information into a dashboard data model. For example, the relationship engine detects all the existing components, input data and output data in the dashboard. The relationship engine then identifies the interaction relationships between the components of the dashboard. The relationship engine identifies the interaction relationships between the components based on interactions of the input data and output data of the components. Detecting and extracting other types of information from the dashboard may also be useful.

Figure 6:
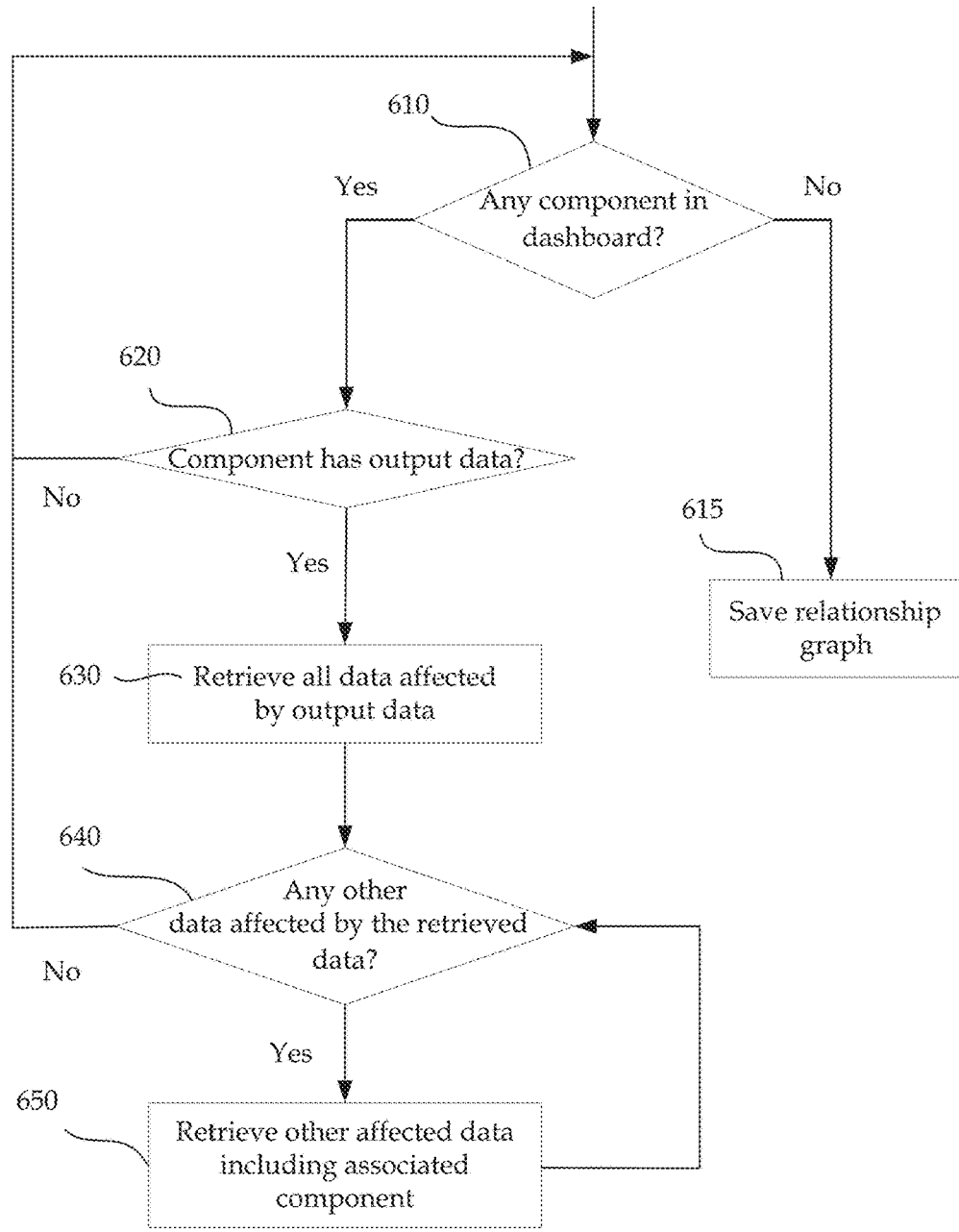
FIG. 6 shows an exemplary process for generating a relationship graph for a dashboard of interest.

In one implementation, the relationship engine extracts the information from the dashboard and generates an interaction relationship graph. FIG. 6 shows an exemplary process 600 for generating a relationship graph for a dashboard of interest. While process 600 describes a series of acts that are performed in sequence, it is to be understood that process 600 is not limited by the order of the sequence. For instance, some acts may occur in a different order than that described. In addition, an act may occur concurrently with another act. In some instances, not all acts may be performed.

At 610, the relationship engine determines if there are any components in the dashboard to be processed. If there are components to be processed, at 620, the relationship engine determines whether a component under analysis has any output data. If no, the process returns to step 610. If yes, at 630, the relationship engine retrieves all data affected by the output data of the component under analysis. For example, a component may have input data and output data. A first component may output data in response to a user interaction. If the first component and a second component have an interaction relationship, the output data of the first component can affect the input data of the second component. For example, the output data affects the input data of a second component if the input data of the second component is impacted by the output data of the first component. For example, the output data of the first component causes a change in the value of the input data of the second component.

Further, it should be appreciated that in the context of the present framework, a data may contain a plurality of data items. For example, an input data and an output data contain a plurality of data items. An item A can affect an item B when a change in the value of item A causes a change in the value of item B. In an exemplary scenario, item A and item B may be the same item. In another exemplary scenario, item B is a formula which depends on item A. A first data such as an output data can affect a second data such as an input data when at least one data item in the output data can affect one data item in the input data.

The data retrieved at 630 includes, for example, input data of components which are affected by the output data and components consuming the affected input data. For example, a target component of the component under analysis is identified. At 640, the relationship engine determines if there are any other data affected by the retrieved data. For example, the retrieved data may affect input data of other components. For example, the output data of the previously identified target component may affect the input data of a second target component. In this case, the previously identified target component may be the source component of the second target component. If the relationship engine determines that no other data are affected by the retrieved data, the process return to step 610. If the relationship engine determines that there are other data affected by the retrieved data, at 650, the relationship engine retrieves all other data affected by the previously retrieved data. For example, the other affected data includes other input data which are affected by the earlier retrieved data and the corresponding component consuming the affected input data (e.g., second target component).

The process then loops to step 640 to determine if there are any other data affected by the retrieved data. For example, the output data of the second target component may affect the input data of a third target component. If no, the process returns to step 610 and loops the analysis of the components in the dashboard until there are no more components to be analysed. The relationship engine generates the interaction relationship graph and saves the graph in the model pool at 615.

Figure 7:
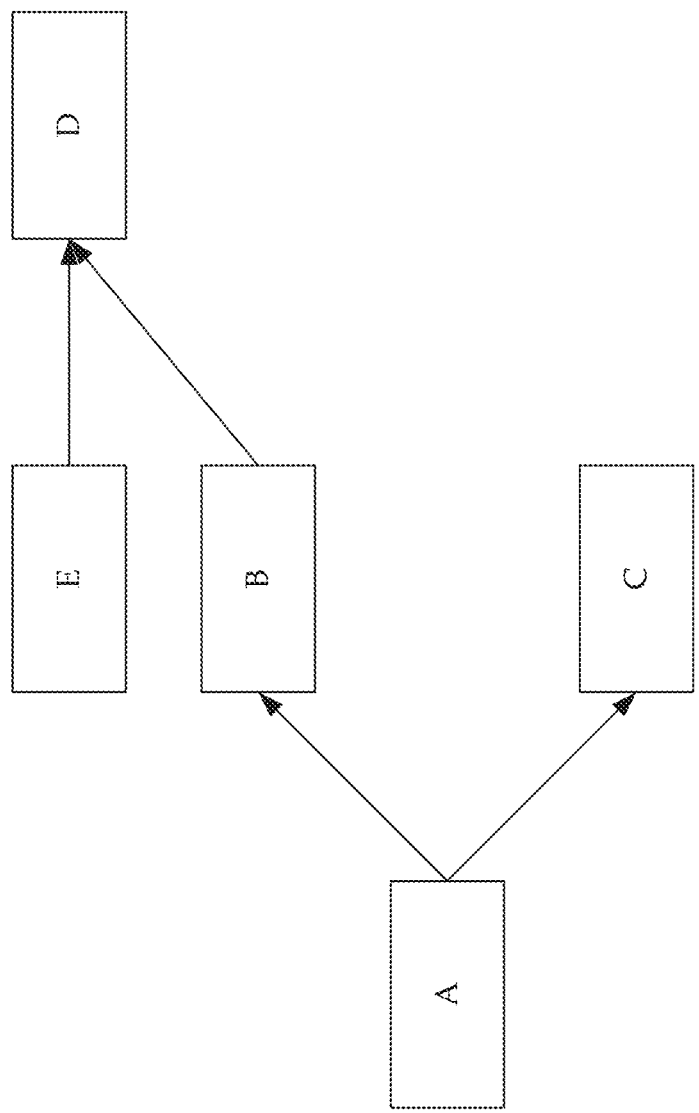
FIG. 7 shows an exemplary relationship graph.

FIG. 7 shows an exemplary relationship graph 700 for a dashboard of interest. The relationship graph identifies the interaction relationships between the components of the dashboard. The dashboard, for example, includes components A, B, C, D and E. As shown, component A has interaction relationships with component B and component C as denoted by the arrows. For example, the relationship may be identified by the relationship engine upon determining that the output data of component A affects the input data of components B and C. The input data of components B and C, for example, are impacted by or dependent on the output data of component A. As shown, source-to-target relationships between the components may be identified in the relationship graph. For example, components B and C are first target components or child components of component A.

As shown, component B has interaction relationship with component D. Component B is the source component of the component D while component D is the target component of component B as illustrated by an arrow pointing from component B to component D, indicating the source-to-target relationships between the components. This relationship may be identified by the relationship engine upon determining that the input data of component D is further affected by the output data of component B, which input data is affected by the output data of component A. For example, component D is the second target component or child component of component A.

As illustrated, component C does not have interaction relationship with other components in which a component is impacted by component C. For example, component C does not have output data. Alternatively, the input data of other components are not affected by the output data of component C. Further, it can be seen that component E has an interaction relationship with component D as illustrated by an arrow pointing from component E to component D. For example, the output data of component E affects the input data of component D. As such, the input data of component D is determined to be affected by the output data of components A, B and E. The input data of component D, for example, is impacted by or dependent on the output data of the components A, B and E of the dashboard. For example, components B and E are direct source components of component D, while component A is an indirect source component of component D. Furthermore, components A and E are not impacted by any other components in the dashboard.

Referring back to FIG. 1, the model pool 124 is a shared storage between the relationship engine and the UI modeler. The model pool serves as an intermediate exchange storage between the relationship engine and the UI modeler at runtime. The model pool may be configured such that the relationship engine has the write permission against the model pool, while the UI modeler has the read permission against the model pool. Providing other storage configurations for the model pool may also be useful. The model pool 124 may be, for example, any database (e.g., relational database, in-memory database, etc.) or set of related records. The database may be stored in a memory device of the interaction relationship building and explorer system. The database may connect with other systems, databases and data sources to acquire data to be used by the applications in the interaction relationship building and explorer system. The data, for example, may be structured data. The database may be organized in any suitable manner such as, for example, data tables or lookup tables. Providing unstructured data may also be useful.

In one implementation, the model pool persists the data models generated by the relationship engine. For example, the model pool may persist the data models for long-term usage. In other implementations, the model pool may persist the data models for diagnostic purposes. In one implementation, the dashboard data model is a data structure of the visual components corresponding to a dashboard, input data and output data interactions and interaction relationships between the components.

In one implementation, the data structure of the dashboard data model includes four different types of models. The dashboard data model includes a component model, input data model, output data model and relationship model. The component model is the model representation of a component in the dashboard. The input data model and output data model are the model representations of input data and output data related to a specific component. The relationship model is the model representation of the relationship between the components of the dashboard. Providing other configurations of the data structure and types of models to represent the dashboard may also be useful.

Figure 8:
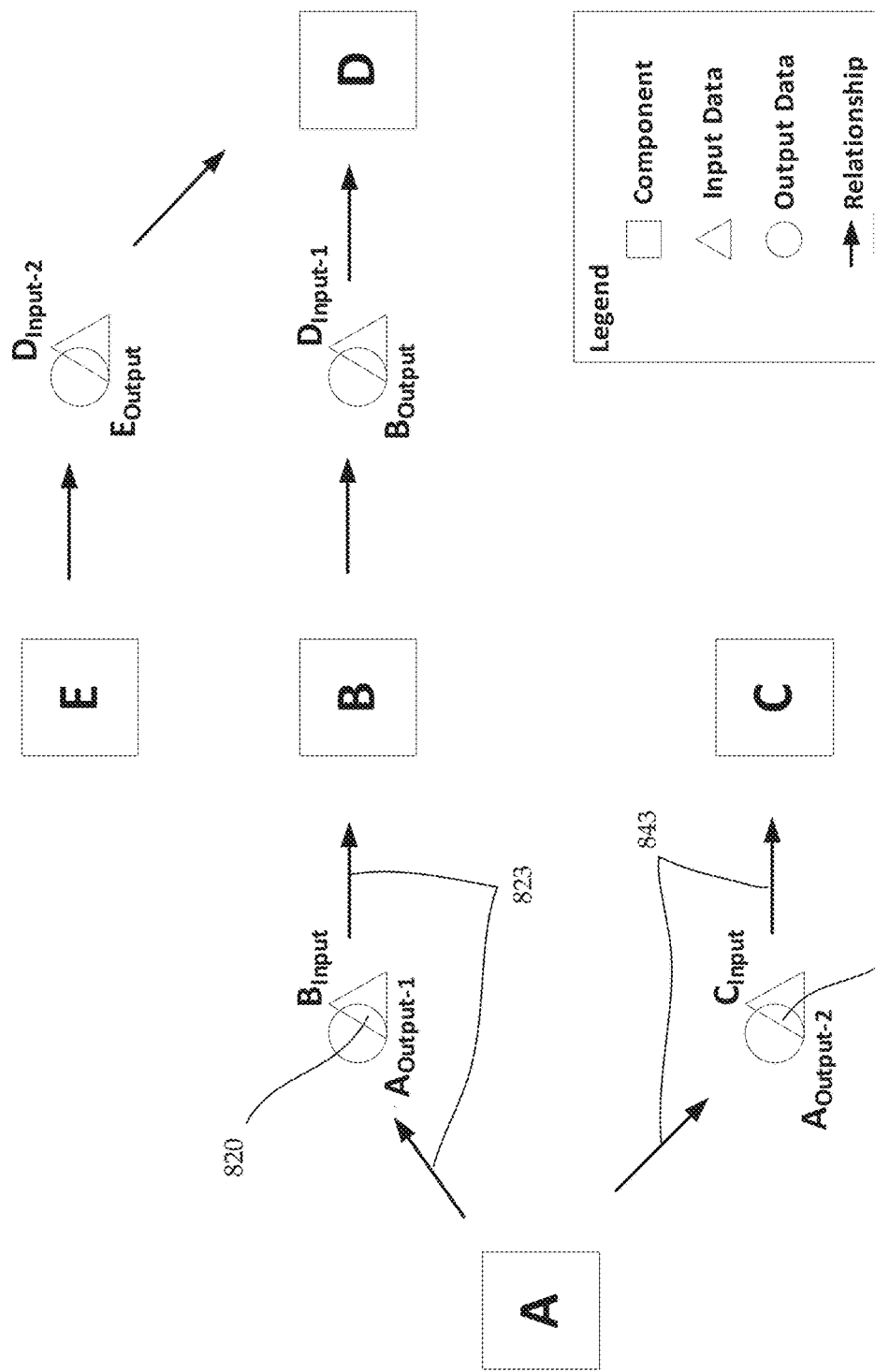
FIG. 8 shows an exemplary data structure of a dashboard stored in the model pool.

FIG. 8 shows an exemplary data structure 800 of a dashboard stored in the model pool. As illustrated, the dashboard includes components A, B, C, D and E as denoted by the square blocks for the component model. Component A produces two output data $A_{Output-1}$ and $A_{Output-2}$, and does not consume any data input. For example, the component A is not impacted by other components.

As for component B, it consumes input data $B_{Input}$, and produces output data $B_{Output}$. The overlap 820 of the output data $A_{Output-1}$ and input data $B_{Input}$ illustrates that the input data of component B is affected by the output data of component A. For example, the component B is impacted by component A. Components A and B have an interaction relationship 823 in the data structure. For example, component A is the source component while component B is the target component. For example, the model pool stores the source-to-target relationship between the source component and the target component. Similarly, component C has an interaction relationship 843 with component A, and the input data $C_{Input}$ consumed by component C is affected by the output data $A_{Output-2}$ of component A as illustrated by the overlap 840 of the output data $A_{Output-2}$ and the input data $C_{Input}$. Component C does not impact other components as component C does not have output data that affects the input data of other components.

As for the UI modeler, it displays a preview of the interaction relationships of the components of a dashboard. The UI modeler is an engine that visualizes the an interaction relationships of the dashboard components to the end user. The UI modeler generates a graphic of the components' relationships in a set of frames and presents the visualization with a user-friendly interface. The user interface may be animation-based design, which shows the end user the relationships of the components from start to end frame by frame. All the components used in the canvas of the dashboard may be displayed in the user interface (UI) including hidden components. For each component, the thumbnail and the component name may be displayed for identification.

As described, the input of the UI modeler is the model pool which contains the data models generated from the relationship engine. For example, the source-to-target relationships may be used to generate the graphical representation of the relationships of all the components used in the dashboard for display in the UI. In other cases, if the user triggers the preview or explorer from a specific component, only the related source and target components and corresponding source-to-target relationships for the specific component are displayed, while other components are hidden.

It should be appreciated that the different components and sub-components of the interaction relationship building and explorer system 120 may be located on different machines or systems such as the user device 150. It should further be appreciated that the components of the user device 150 may also be located on the interaction relationship building and explorer system, or vice versa.

Figure 9:
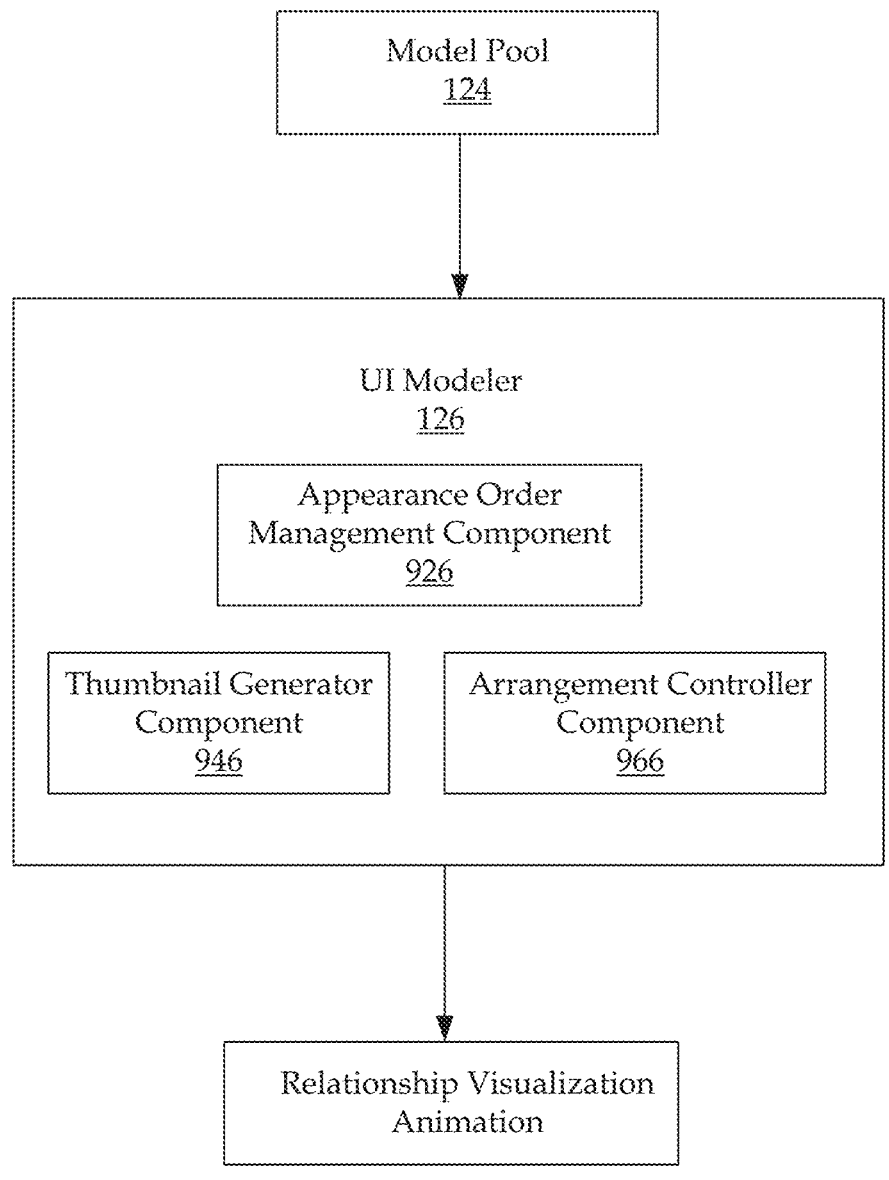
FIG. 9 shows an exemplary embodiment of a UI modeler.

FIG. 9 shows an exemplary embodiment 900 of the UI modeler. In one implementation, the UI modeler includes an appearance order management component 926, a thumbnail generator component 946 and an arrangement controller component 966. Providing other modules for the UI modeler may also be useful. The various modules may be employed to display the interaction relationships between the visual components of a dashboard. The UI modeler retrieves the dashboard data models containing the relationship graph with source-to-target relationships stored in the model pool, processes it for display and outputs an animation of the relationship visualization of the dashboard.

The appearance order management component 926 goes through all the components in the relationship graph and determines the display order in frames and the manner for presenting the interaction relationships. For example, a map contains a total number of components for display in one dashboard. The map size determines the number of the components in the first frame. The output of the appearance order management component is the frame set including the appearance order of all components.

The thumbnail generator component 946 generates the thumbnails for all the components including the components hidden from view. This enables a user to easily identify the components from a view. The thumbnail generator component saves the thumbnails in a table. The key is component GUID where GUID is the component unique identifier in the current dashboard, and the value is the thumbnail binaries, which stores snapshots for each component in image format. The thumbnails may be set as a property of the components in the frame set. Providing other thumbnails and properties for displaying the components may also be useful.

The arrangement controller component 966 determines how the components may be displayed in the UI, the position, size and shape of the components and the directions. The input of the arrangement controller component is the frame set (e.g., the output of appearance order management component). Exemplary arrangement rules include (1) the size of the animation is fixed, all components are displayed in the same scale, and the thumbnails uses the same width and height; (2) after completion of the animation, the picture or visualization of a frame can be enlarged if there are too many components and the scale is too small; (3) the components in different frames are displayed in the same scale and space; (4) the components in the first frame are arranged based on the space; (5) the components in the other frames except the first frame are displayed according to the source-to-target relationships, and the position of the target components would be adjusted based on the position of the source components.

Figure 10:
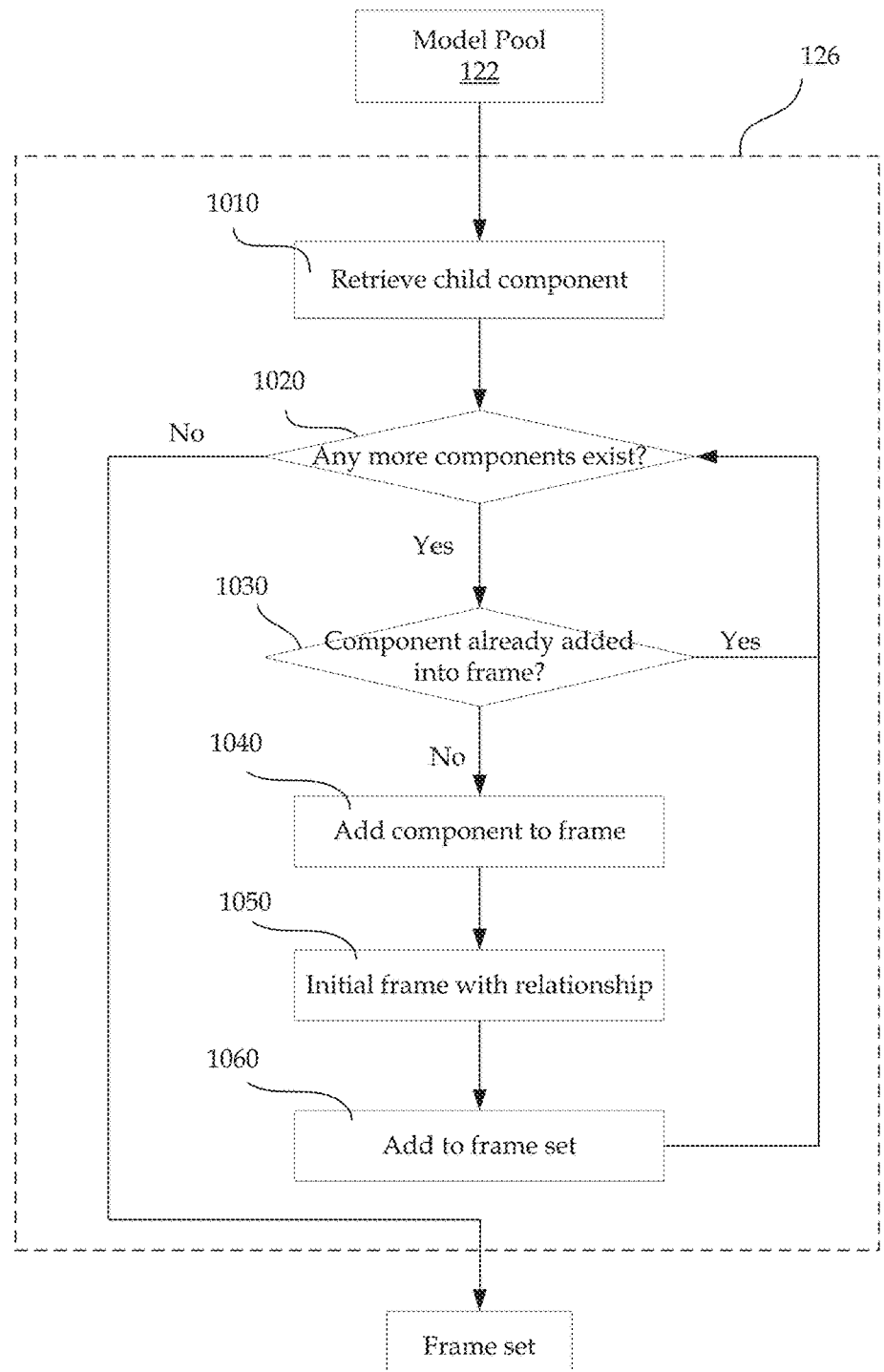
FIG. 10 shows an exemplary process for determining the display order of components and their interaction relationships.

FIG. 10 shows an exemplary process 1000 by the appearance order management component of the UI modeler for determining the display order of the components and corresponding interaction relationships and the manner for presenting the interaction relationships. The dashboard components and the corresponding interaction relationships of the components may be presented in frames. At 1010, the UI modeler retrieves the child components of a component from the model pool. The UI modeler, for example, retrieves the target components of a source component. For example, the retrieved target components are child components of a first source component to be displayed.

At 1020, the UI modeler determines whether more components exist for each child component. For example, each retrieved child component may be a source component. The UI modeler determines one or more target components for the child component. If no more components exist, the process proceeds to output a frame set. If there are more components, at 1030, the UI modeler determines whether the component under analysis has been added into a frame. If the component under analysis has not been added into a frame, at 1040, the UI modeler adds the component into a frame. At 1050, the UI modeler initials the frame with the relationship between the child component and the component under analysis. At 1060, the UI modeler adds the frame to the set of frames. The UI modeler then returns to step 1020 to determine whether more components exist for the component under analysis.

Figure 11:
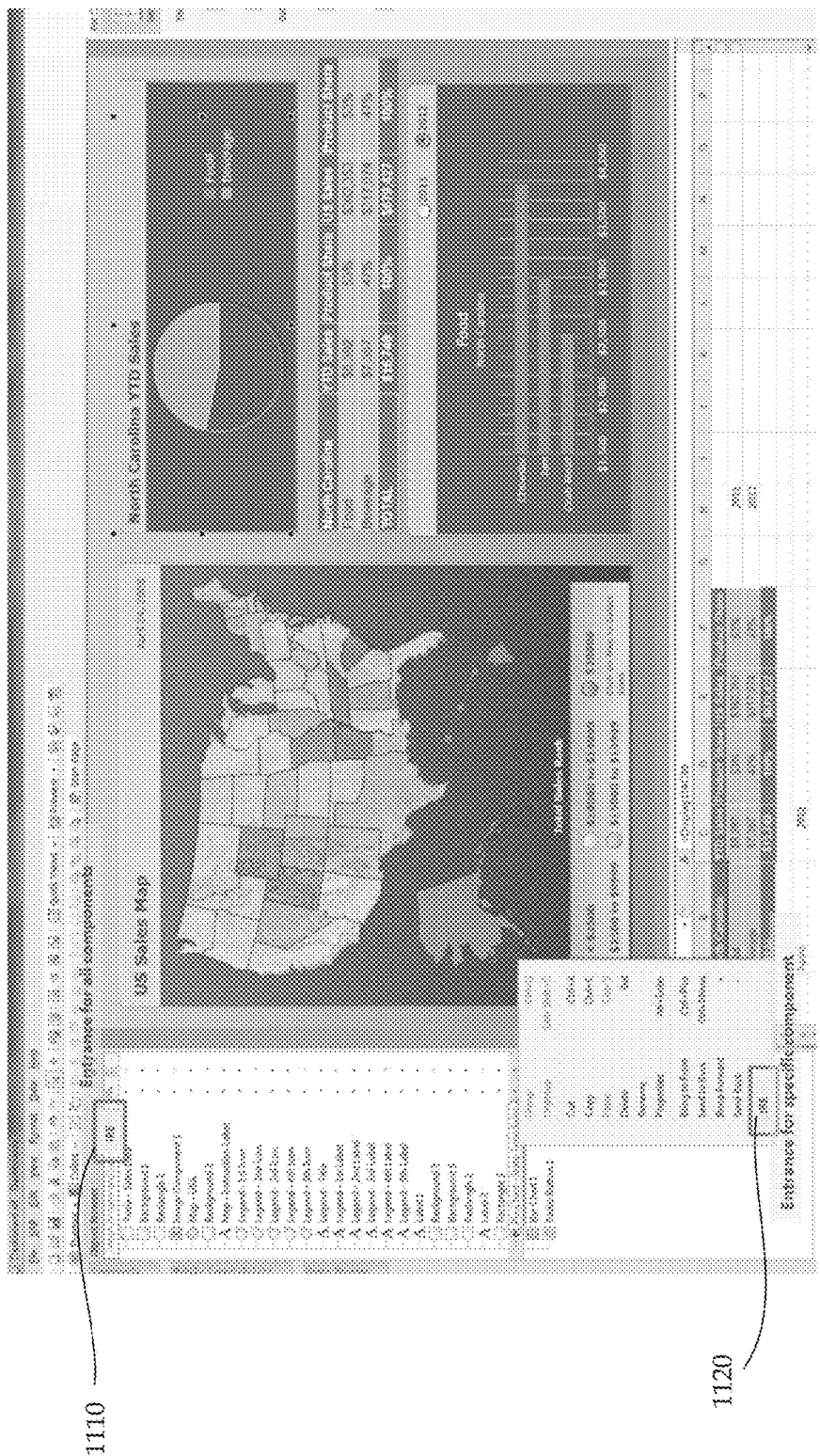
FIG. 11 shows an exemplary canvas used for designing a dashboard.

FIG. 11 shows a screenshot of an exemplary canvas 1100 for designing a dashboard. A dashboard designer, for example, may be presented with an option to explore or analyze the interaction relationships between the components. For example, the dashboard designer may select an icon 1110 to display the interaction relationships for all the components of the dashboard. The interaction relationship building and explorer system may present the relationships of all components using the set of frames. For example, an animation may be played based on the frame set. In other cases, the dashboard designer may select an icon 1120 to display the interaction relationships for a specific component of the dashboard. For example, the dashboard designer may select the icon 1120 to display the interaction relationships of the pie chart component in the dashboard. The interaction relationship building and explorer system may present the source and target components of the selected component and the corresponding source-to-target relationships using the frame set.

Figure 12:
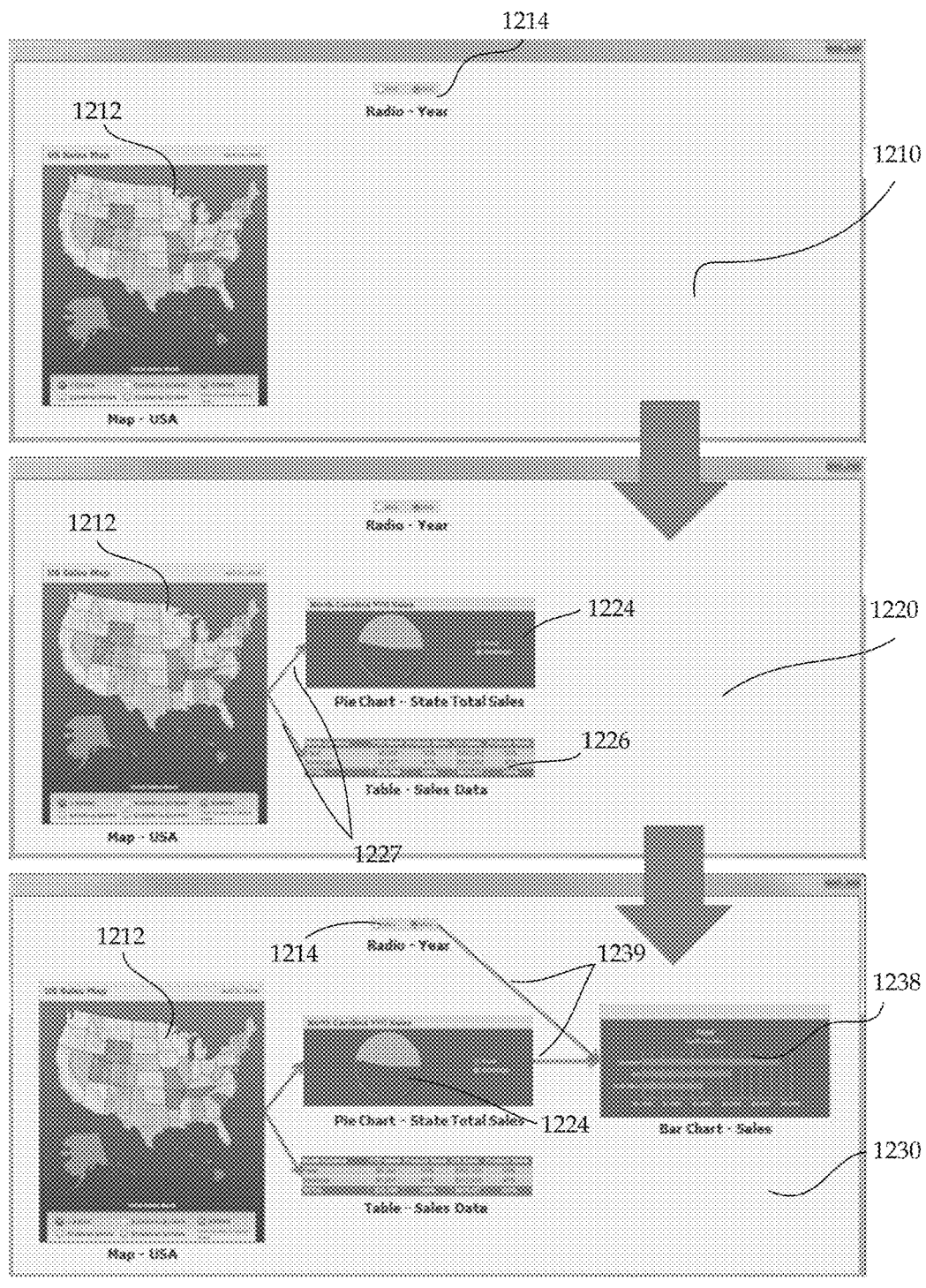
FIG. 12 shows a screenshot of an exemplary animation for displaying the interaction relationships of all components of a dashboard.

FIG. 12 shows a screenshot of an exemplary animation 1200 for displaying the relationships of all components of a dashboard. In the example, the UI modeler uses three frames 1210, 1220, and 1230 to display the interaction relationships of all the components. The interaction relationships are displayed in sequence from source to target components. For example, the animation may start from the source components. For example, in the first frame 1210, a map component 1212 as described in FIG. 2 may be displayed. The map component is the source component of all the components in the dashboard. Further another source component such as filtering component (e.g., radio button component) 1214 is displayed in the dashboard. For example, the radio button component enables a user to view a desired subset of data such as sales data of different periods such as different years.

The next frame 1220 displays the child components or target components 1224 and 1226 of the map component and the interaction relationships 1227 between the source and target components. An interaction relationship, for example, may be represented by a graphical indicator such as an arrow that points from the source component to the target component. For example, the pie chart 1224 and table chart 1226 each have an arrow pointing from the map component 1212 indicating the source-to-target relationship. Providing other graphical indicators for representing the interaction relationships may also be useful.

The subsequent frame 1230 displays the child component or target component (e.g., bar chart) 1238 of the pie chart 1224 component and the interaction relationships 1239 of the bar chart component. As shown, the bar chart component has interaction relationship 1239 with the pie chart component 1224 and the radio button component 1214. For example, the pie chart component 1224 and the radio button component 1214 are the source components of bar chart component 1238. In other words, the sales data represented by the bar chart component 1238 is dependent on or impacted by the selected year "2015" represented by the radio button component 1214, the total sales of a state based on product category represented by the pie chart component 1224, and the state selected in the map component 1212 (e.g., North Carolina).

The animation uses the frames (e.g., three frames) to sequentially display the source-to-target relationships of all the components. The frames, for example, present different source-to-target relationships of all the components starting from the source components. This enables a user to be presented with an overview of the relationship map of the components of the dashboard. The animation enables the user to identify that a user selection in the map component impacts the pie chart component, bar chart component and table component of the dashboard, but not the radio button component. Further it can be determined that the radio button component only impacts the bar chart component. For example, selecting an element in the radio button component impacts the bar chart component, but not other components of the dashboard.

Figure 13:
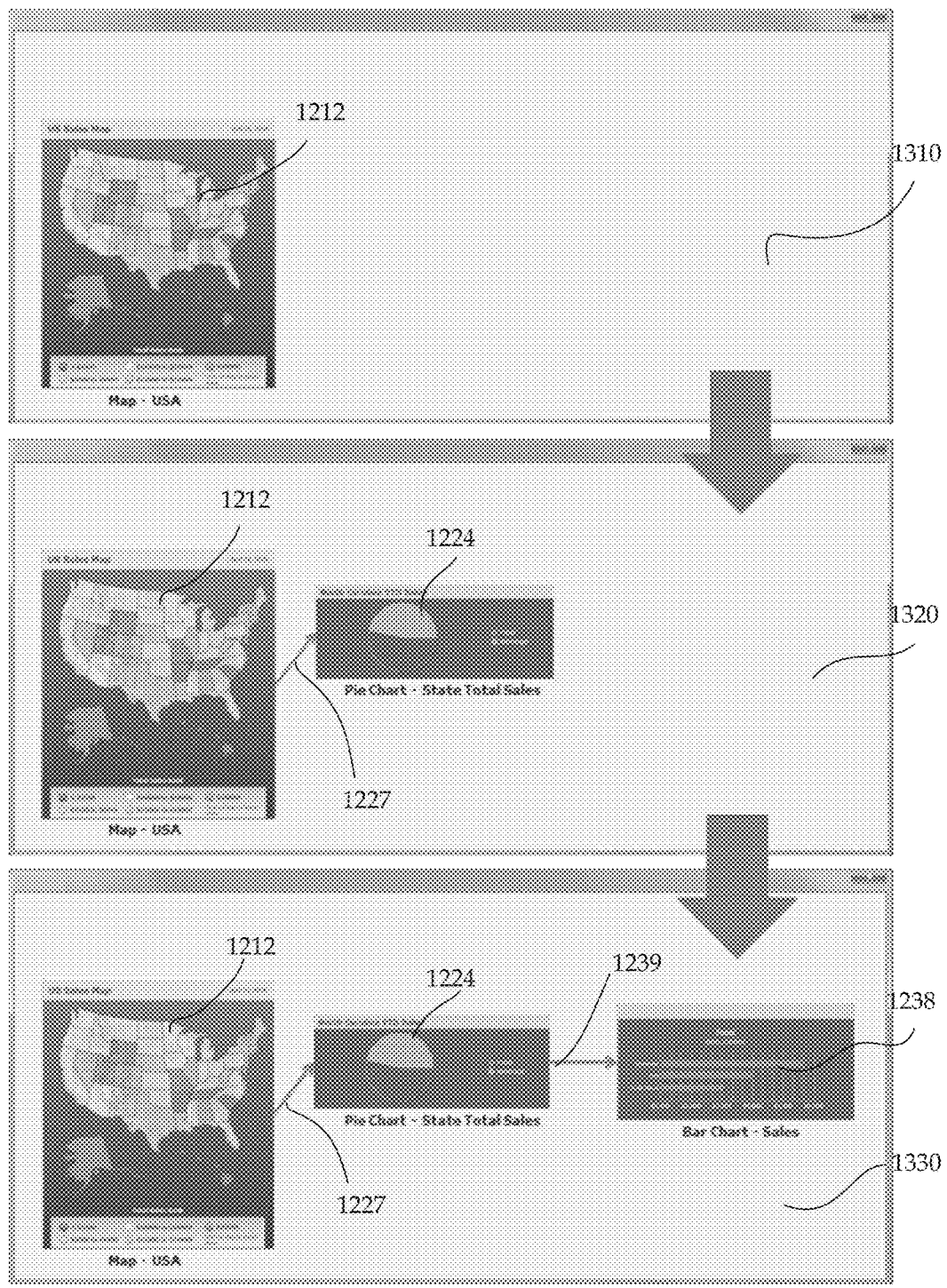
FIG. 13 shows a screenshot of an exemplary animation for displaying the interaction relationships of a specific dashboard component.

FIG. 13 shows a screenshot of an exemplary animation 1300 for displaying the relationships of a specific dashboard component. The specific component, for example, may be a component selected by the user for exploring its interaction relationships. For example, the selected component may be a pie chart component 1224 which displays the total sales of a state as described in FIG. 12. The animation may display the source and target components of the selected component. In the example, the UI modeler uses three frames 1310, 1320, and 1330 to display the interaction relationships of the selected component. The interaction relationships are displayed in sequence from source to target components for the selected component. For example, in the first frame 1310, the source component of the selected pie chart component is displayed. As shown, a map component 1212 is displayed.

The next frame 1320 displays the target component 1224 of the map component and the interaction relationships 1227 between the source and target components. For example, the selected pie chart component 1224 is the target component of the map component. A graphical indicator such as arrow 1227 points from the map component 1212 to the pie chart component 1224 to represent the interaction relationship. As shown, other child components or target components of the map component is not displayed as they do not have interaction relationship with the pie chart component with which the user is interested.

The subsequent frame 1330 displays the target component (e.g., bar chart) 1238 of the pie chart component 1224 and the interaction relationship 1239 between the pie chart component 1224 and the bar chart component 1238. For example, the user selected pie chart component is the source component of the bar chart component 1238. In other words, the sales data represented by the bar chart 1238 is dependent on and impacted by the total sales of a state based on product category represented by the pie chart component 1224, which is further dependent on the state selected in the map component 1212. As illustrated, the radio button component 1214 as described in FIG. 12 is not displayed in the present animation 1300 with respect to the selected pie chart component 1224 since there is no interaction relationship between the radio button component and the selected pie chart component. For example, the output data of the selected pie chart component does not impact the input data of the radio button component.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for modelling and displaying interaction relationships between visual components of a dashboard, comprising:
defining a relationship between dashboard components, wherein the dashboard components comprise one or more visual components, using a data grid, the data grid including rows and columns forming grid cells, wherein defining the relationship comprises associating a first visual component to a grid cell and defining a formula in the grid cell based on at least one other grid cell, wherein the first visual component is further associated to a plurality of additional visual components, and further wherein the first visual component comprises one or more of:
a source component having a first plurality of the additional visual components as target components, or
a target component having a second plurality of the additional visual components as source components;
converting information of the dashboard including dashboard components, input data and output data in the dashboard into dashboard data models;
determining each of the source-to-target relationships for the first visual component, the determining comprising:
determining whether the first visual component comprises a source component, and
determining whether the first visual component comprises a target component;
generating an interaction relationship graph based on interactions of the input data and output data of the dashboard components, wherein the interaction relationship graph comprises source-to-target interaction relationships between source and target dashboard components; and
retrieving a dashboard data model comprising the source-to-target interaction relationships of the interaction relationship graph, and based on the retrieved dashboard data model:
visually presenting:
the first visual component,
the first plurality of additional visual components, if any, and
the second plurality of additional visual components, if any; and
visually presenting the source-to-target interaction relationships between the presented visual components using the dashboard data models containing the source-to-target interaction relationships, wherein the presenting comprises, either automatically or in response to receiving a single user input, concurrently presenting each of the plurality of source-to-target interaction relationships for the first visual component.

2. The method of claim 1 wherein the dashboard data models comprise a component-type model, an input data-type model, an output data-type model and a relationship-type model.

3. The method of claim 1 further comprising visually presenting all visual components of the dashboard and their source-to-target interaction relationships.

4. The method of claim 1 wherein visually presenting the source-to-target interaction relationships between the presented visual components of the dashboard comprises, in response to receiving the single user input, presenting only source and target components of the first visual component and corresponding source-to-target interaction relationships with the first visual component.

5. The method of claim 1 wherein visually presenting the source-to-target interaction relationships between the presented visual components is performed using a set of multiple frames that collectively present each of the source-to-target relationships for each of the presented visual components, wherein each frame of the set of multiple frames visually presents a different set of source-to-target relationships.

6. The method of claim 5 wherein a frame of the set of multiple frames displays the source-to-target interaction relationships for the first visual component and the first plurality of additional visual components, if any, and the second plurality of additional visual components, if any.

7. The method of claim 6 wherein visually presenting the source-to-target interaction relationships comprises displaying the components based on an appearance order of the presented visual components.

8. The method of claim 1 further comprising decoupling the first visual component from the grid cell while maintaining the formula defined in the grid cell, and associating another dashboard component to the grid cell.

9. A system for displaying interaction relationships between components of a dashboard, comprising:
a non-transitory memory device for storing computer-readable program code; and
a processor in communication with the memory device, the processor being operative with the computer-readable program code to:
provide a dashboard containing dashboard components comprising visual components, input data and output data,
wherein a first visual component comprises:
a source component having a first plurality of additional visual components as target components, or
a target component having a second plurality of additional visual components as source components;
determine each of the source-to-target relationships for the first visual component, the determining comprising:
determining whether the first visual component comprises a source component, and
determining whether the first visual component comprises a target component;
generate an interaction relationship graph based on interactions of the input data and output data of the components, the interaction relationship graph comprises source-to-target interaction relationships between source and target components of the dashboard; and
retrieve a dashboard data model comprising the source-to-target interaction relationships of the interaction relationship graph, and based on the retrieved dashboard data model:
visually present:
the first visual component,
the first plurality of additional visual components, if any, and
the second plurality of additional visual components, if any; and
visually present the source-to-target interaction relationships between the presented visual components using the source-to-target interaction relationships, wherein the presenting comprises, either automatically or in response to receiving a single user input, concurrently presenting each of the plurality of source-to-target interaction relationships for the visual component.

10. The system of claim 9 further comprising building the interaction relationships between components of the dashboard by defining a relationship between the components using a data grid.

11. The system of claim 10 wherein defining the relationship comprises associating a component to a grid cell and defining a formula in the grid cell based on one or more other cells which are further associated to one or more other components.

12. The system of claim 11 further comprising decoupling the associated component from the grid cell while maintaining the formula defined in the grid cell, and associating another component to the grid cell.

13. The system of claim 9 wherein visually presenting the source-to-target interaction relationships between the visual components is performed using a set of multiple frames, wherein each frame of the set of multiple frames contains a different set of different source-to-target relationships.

14. The system of claim 13 wherein a frame of the set of multiple frames displays the source-to-target interaction relationships for the first visual component and the first plurality of additional visual components, if any, and the second plurality of additional visual components, if any.

15. The system of claim 9 wherein visually presenting the interaction relationship between the presented visual components of the dashboard comprises, in response to receiving the single user input, presenting only source and target components of the first visual component and corresponding source-to-target interaction relationships with the first visual component.

16. A non-transitory computer readable medium embodying a program of instructions executable by machine to perform steps for displaying interaction relationships between visual components of a dashboard, comprising:
providing a dashboard containing dashboard components, input data and output data;
wherein a first visual component comprises:
a source component having a first plurality of additional visual components as target components, or
a target component having a second plurality of additional visual components as source components;
determining each of the source-to-target relationships for the first visual component, the determining comprising:
determining whether the first visual component comprises a source component, and
determining whether the first visual component comprises a target component;
generating an interaction relationship graph based on interactions of the input data and output data of the components, the interaction relationship graph comprises source-to-target interaction relationships between source and target components of the dashboard; and
retrieving a dashboard data model comprising the source-to-target interaction relationships of the interaction relationship graph, and based on the retrieved dashboard data model:
visually presenting:
the first visual component,
the first plurality of additional visual components, if any, and
the second plurality of additional visual components, if any; and
visually presenting the source-to-target interaction relationships between the presented visual components using the source-to-target interaction relationships, wherein the presenting comprises, either automatically or in response to receiving a single user input, concurrently presenting each of the plurality of source-to-target interaction relationships for the first visual component.

17. The non-transitory computer readable medium of claim 16 further comprising presenting the interaction relationship between the visual components using a set of multiple frames, wherein each frame of the set of multiple frames contains a different set of different source-to-target relationships.

18. The non-transitory computer readable medium of claim 17 wherein a frame of the set of multiple frames displays the source-to-target interaction relationships for the first visual component and the first plurality of additional visual components, if any, and the second plurality of additional visual components, if any.

19. The non-transitory computer readable medium of claim 16 further comprising building the interaction relationships between components of the dashboard by defining a relationship between the components using a data grid.

20. The non-transitory computer readable medium of claim 19 wherein defining the relationship comprises associating a component to a grid cell and defining a formula in the grid cell based on one or more other cells which are further associated to one or more other components.

* * * * *